Figure 12:
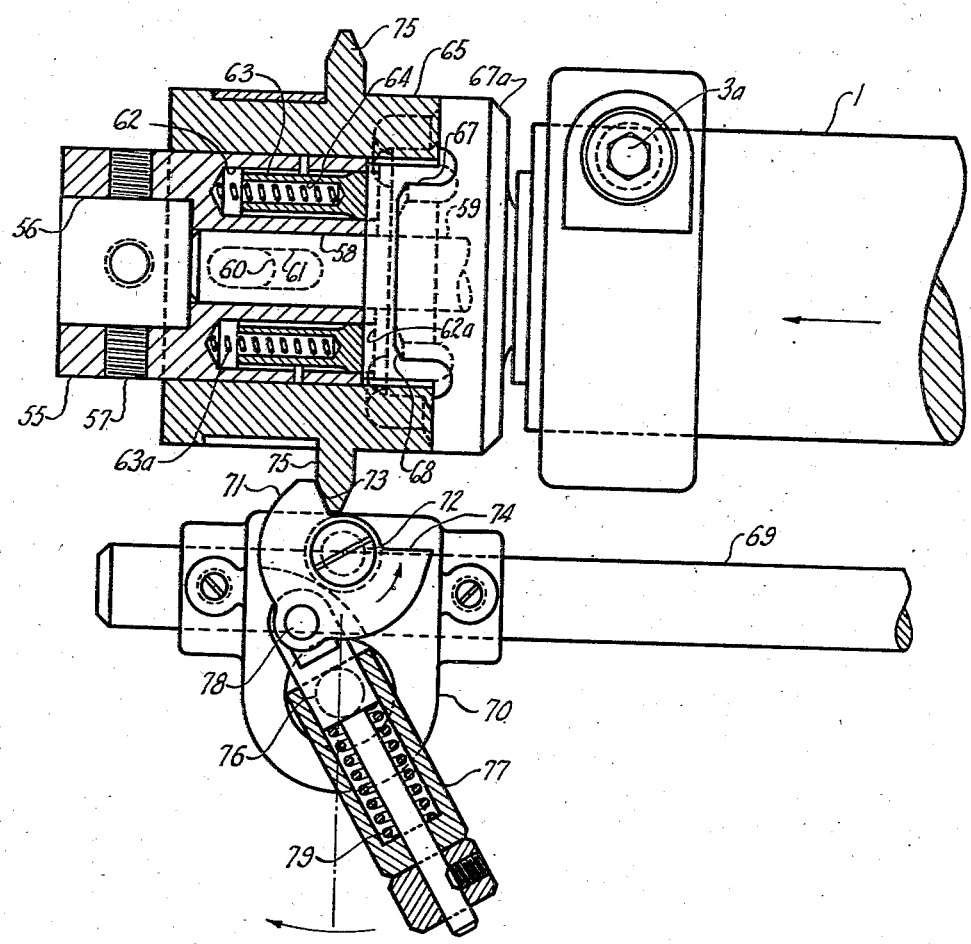

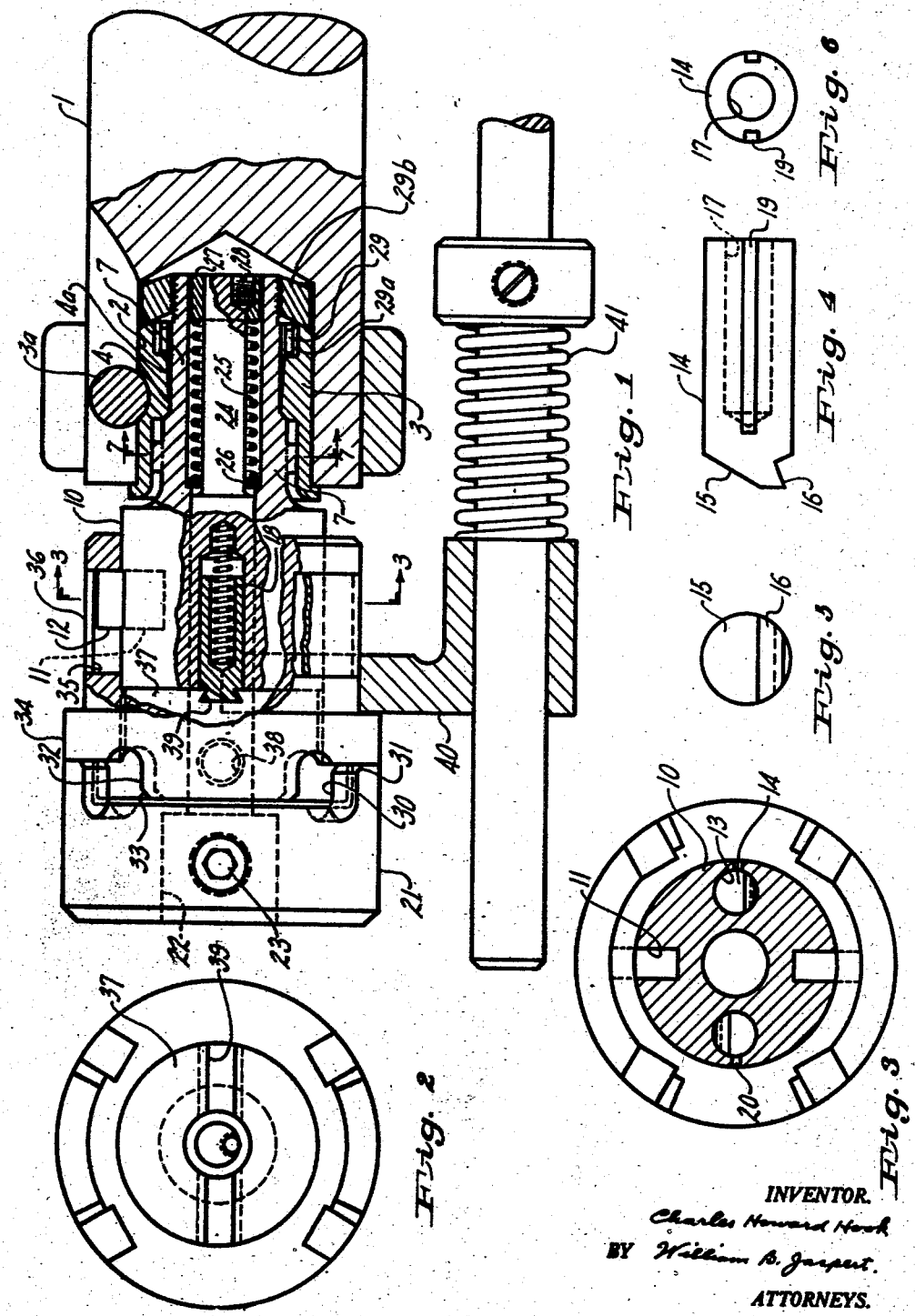

May 8, 1945.  C. H. HOOK  2,375,554
REVERSIBLE TAP HOLDER
Filed Feb. 2, 1944  3 Sheets-Sheet 2
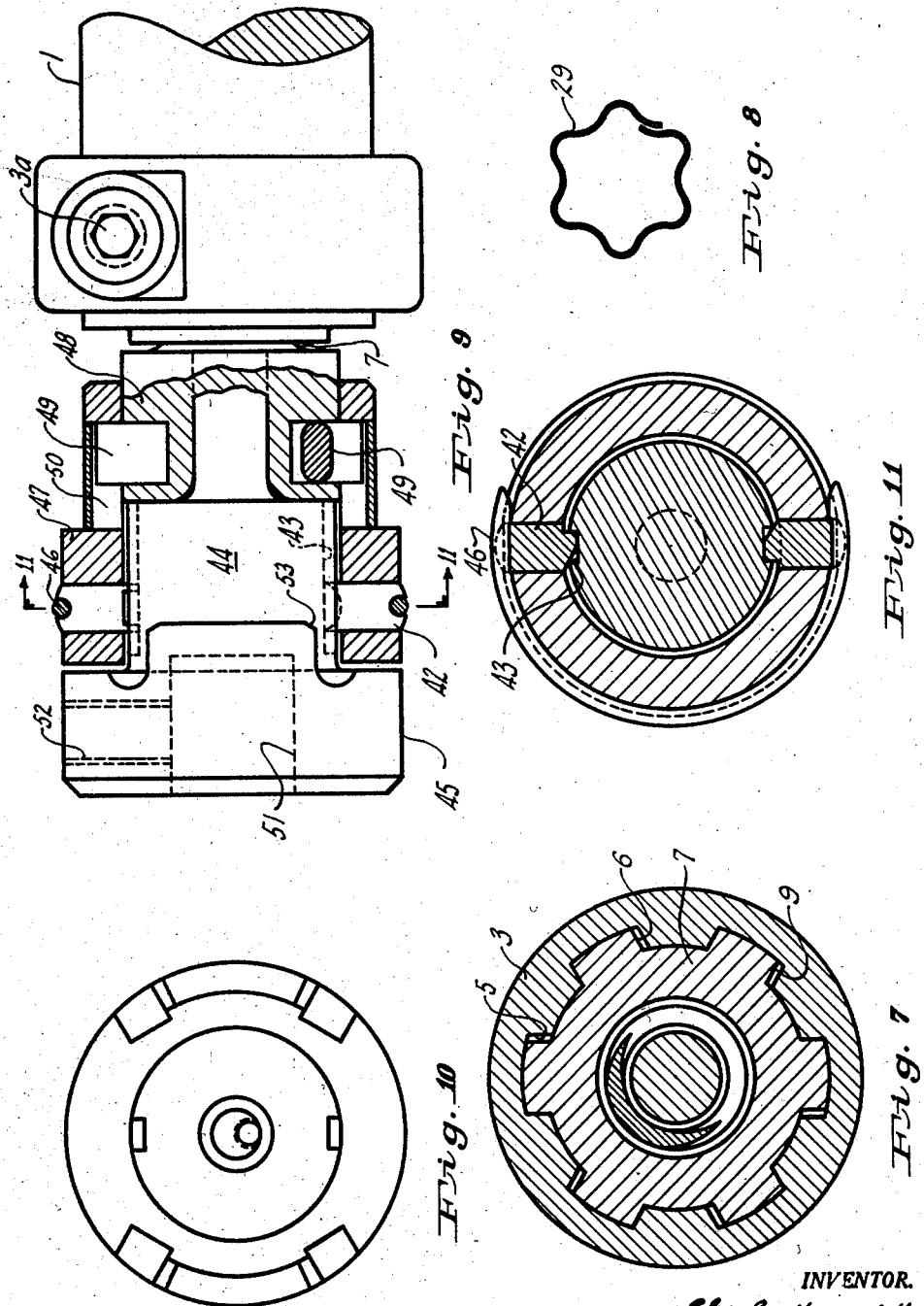
INVENTOR.
Charles Howard Hook
BY William D. Jaspert
ATTORNEYS.

May 8, 1945.    C. H. HOOK    2,375,554
REVERSIBLE TAP HOLDER
Filed Feb. 2, 1944    3 Sheets-Sheet 3

INVENTOR.
Charles Howard Hook
BY William B. Jaspert.
ATTORNEYS.

Patented May 8, 1945

2,375,554

UNITED STATES PATENT OFFICE 2,375,554

REVERSIBLE TAP HOLDER

Charles Howard Hook, Pittsburgh, Pa.

Application February 2, 1944, Serial No. 520,729

10 Claims. (Cl. 10—89)

This invention relates to new and useful improvements in tap holders more particularly to tap holders of the reversible type and it is among the objects thereof to provide a tap holder of simple compact and durable mechanical construction in which the coacting and engaging parts are designed and operated to eliminate wear and prevent breakage of the taps.

In a co-pending application, Serial Number 502,623 filed September 16, 1943, I have described a reversible tap holder in which the clutch faces are forcibly separated at the end of the tapping or threading operation by means of trail-off edges on the clutch teeth. The present invention utilizes this feature of forcibly separating the clutch faces at the end of the tap travel and provides for the reengagement of the receding clutch element upon return of the tap holder to its initial working position.

The invention further provides a form of tap holder especially suited for deep threading.

The invention further contemplates the provision of a pawl and ratchet design which eliminates friction and in which the pawls are reversible to make the holder useful for both left and right hand threaded taps.

Figures 13, 14, 15:
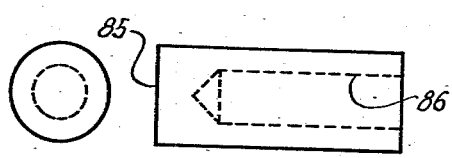

The invention will become more apparent from a consideration of the accompanying drawings in which like reference characters designate like parts and in which, Fig. 1 is a side elevational view partially in section of a reversible tap holder embodying the principles of this invention;

Fig. 2, a rear end view of the tap holder removed from the threading spindle;

Fig. 3, a cross sectional view taken along the line 3—3, Fig. 1;

Figs. 4, 5 and 6, a side elevational, front and rear elevational views respectively of a backout pawl;

Fig. 7, an enlarged cross-sectional view taken along the line 7—7, Fig. 1;

Fig. 8, an end elevational view of a special spring employed in the structure of Fig. 1;

Fig. 9, a side elevational view partially in section of a modified form of tap holder;

Fig. 10, a rear end view of the tap holder removed from the threading spindle;

Fig. 11, a cross section taken along the line 11—11 of Fig. 9;

Fig. 12, a side elevational view, partially in section of still another modified form of tap holder;

Fig. 13, an end elevational view of a modified form of backout pawl;

Fig. 14, a side elevational view thereof; and

Fig. 15, a diagrammatic illustration of the backout pawl engagement with the ratchet teeth.

With reference to Fig. 1 of the drawings, the structure therein illustrated comprises a threading spindle 1 of an automatic screw machine or the like having a socket end 2 for receiving a sleeve 3 having a restricted bore 4 which is chamfered at 4a as shown. The sleeve 3 is provided with spline slots 5, Fig. 7, for receiving the splines 6 of a tap holder shank 7, sufficient clearance 9 being provided in the spline member to permit of some angular movement between the spline members and also to permit of some wobble movement between the tap holder shank 7 and the sleeve 3 for self alignment of the tap as it enters the work piece. Sleeve 3 is secured against movement by a pin 3a.

The tap holder shank 7 is provided with a cylindrical head 10 which as shown in Fig. 3 is provided with slots 11 for receiving keys 12. Drill holes 13 are provided for receiving backout pawls 14 which are chamfered at 15 to form a tooth 16, the members 14 being drilled at 17 to receive coil springs 18 which normally bias the back-out pawls forwardly in the direction of their chamfered ends. Slots 19 are provided in the sides of the back-out pawls for engagement by set screws through tap holes 20 which permit axial movement of the pawls while preventing rotation. This also makes the pawls reversible by turning them 180° for threading in the opposite direction.

The tap holder or driver head designated by numeral 21 is provided with a socket 22 for receiving the shank of the tap (not shown) which is secured therein by screw 23. The tap holder has a shaft 24 extending into the hollow shank 7 which is biased by a coil spring 25 abutting against a washer 26 at one end and a ring 27 at its other end, the ring being secured on the tap holder shaft 24 by a set screw 28. A spring washer 29 of the shape shown in Fig. 8 made of ribbon steel is provided in the recess 29a near the end of the hollow shank 7 to yieldingly restrain the latter in its wobble movement. A nut 29b is secured to the end of the tap holder shank 7 to secure the same to sleeve 3.

The tap holder 21 is provided with clutch teeth 30 having trail-off edges 31 which teeth interact with teeth 32 with trail-off edges 33 of a receding clutch 34 which is slidably mounted on the cylindrical head 10 and held against rotation by the keys 12 which are disposed in slots 35 of the receding clutch member. A spring housing 36 of annular shape retains keys 12 against radial displacement.

The tap holder 21 is provided with a cylinder block 37 that is secured to the tap holder shaft 24 by a screw 38. The block 37 is provided with a dovetail slot 39 for receiving the teeth 16 of the backout pawls. A stop 40 having a back-up spring 41 is mounted on a fixed rod adjacent the tap holder for engaging the receding clutch to return it to its tooth engaging position with the tap holder. The operation of the tap holder shown in Figs. 1 to 8 inclusive of the drawings is briefly as follows:

With the tap secured in socket 22 by set screw 23 the tap holder is positioned as shown in Fig. 1 for engaging the work to be threaded which is rotating. As the tap progresses into the work the holder 21 will move bodily in an axial direction against tension of the coil spring 25 with the teeth 30 gradually disengaging the teeth 32 until at the moment the tap bottoms in the bore of the article being tapped the trail-off edges 31 and 33 will be in alignment and the tap holder will kick out the receding clutch 34 thus disengaging the clutch teeth. At the same time the back-out pawls 14 will ride out of engagement with the dove-tail slot 39 allowing tap holder 21 to freely rotate with the work.

Upon retraction of the threading spindle the teeth 16 of the back-out pawls will lock in slot 39 of the tap holder and hold it against rotation causing the tap to retract from the threaded opening and spring 25 will draw back the tap holder 21. As the threading spindle 1 is retracted to the original starting position stop 40 will engage the receding clutch 34 and move it into engagement with the tap holder clutch teeth 30 as shown in Fig. 1 ready for the next tapping operation.

In the structure shown in Figs. 9 to 11 inclusive of the drawings the tap holder shank and mounting in the threading spindle 1 is the same as shown in Fig. 1. The structure differs primarily in that the back-out pawls 42 are radially disposed in the receding clutch to engage a plurality of elongated slots 43 in the cylindrical body 44 of the tap holder 45. The back-out pawls are engaged by a peripheral spring 46 as shown in Fig. 11. The receding clutch 47 is slidably mounted on the cylindrical body 44 and head 48 of the hollow tap holder shank 7 more clearly shown in Fig. 1. Keys 49 carried by the head 48 limit the movement of the receding clutch 47 within the length of the slots 50.

The tap holder 45 is provided with a socket 51 for receiving the end of a tap (not shown) which is held by a set screw fitted in the threaded opening 52. The tap holder 45 and receding clutch 47 are provided with interacting clutch teeth with trail-off edges the same as the structure of Fig. 1. The operation of the type of clutch holder shown in Figs. 9 to 11 is briefly as follows:

After the tap has completed the threading operation the tap holder 45 will have disengaged the teeth of the receding clutch 47 and the latter will be displaced axially toward the rear by the blow struck through the trail-off edges 53 of the tap holder clutch. The tap holder or driver is then free to rotate with the back-out pawls ratcheting over the slots 43 of the tap holder body 44. When the tap is withdrawn the back-out pawls will align the clutch teeth and stop 40 will engage the receding clutch 47 to restore it to the position shown in Fig. 9 by rearward movement of the threading spindle.

In the form of the device shown in Fig. 12 of the drawings the manner of mounting of the tap holder in the threading spindle may be the same as shown in Figure 1, the essential difference being that the clutch mechanism is at the shank of the holder instead of at the front.

The numeral 55 designates the tap holder or driver the tap being secured in the socket 56 by set screws in the threaded openings 57. The tap holder 55 is provided with a central bore 58 and is pressed on the shaft 59 and secured by set screws (not shown). The tap holder 55 is provided with a key 60 which is engaged by key slot 61 of a receding clutch 65. The tap holder is provided with drill holes 62 for receiving back-out pawls 63 that are biased toward the clutch slot 62a of the shank 67a by coil springs 63a which are disposed in the bores 64 of the back-out pawls. The receding clutch 65 is mounted for sliding movement on the body of the tap holder 55 within the limits of keyslot 61 and is provided with clutch teeth that engage the teeth 67 on the tap holder shank 67a. The teeth are provided with the trail-off edges 68 which function to forcibly kick out the receding clutch when the clutch teeth have been disengaged to the point of contact of the trail-off edges 68.

Instead of employing the fixed stop 40 for the receding clutches at the end of the tapping operation a spring actuated swivel toggle is mounted on the rod 69 that is stationary. The toggle mechanism consists of a bracket 70 on which a lobe 71 is pivotally mounted by screw 72, the lobe having a notch with faces 73 and 74 which are adapted to engage a disc 75 formed integrally with the receding clutch body. A plunger 76 mounted in a sleeve 77 is pivoted at 78 to the lobe 71. Plunger 76 is biased by a loading spring 79 which is compressed during the swivel movement of the lobe 71.

A modified form of back-out pawl is illustrated in Figs. 13 to 15 inclusive. Instead of the chamfered end or teeth the pawl is provided with a square face 85 and a central bore 86 for receiving the spring for biasing the pawl against the face 87 of the clutch. There are no slots in the outer wall of the pin for reversing the setting as none are needed, the pawls being operable in one direction only to either slide over or engage teeth 86 of the clutch depending upon the direction of rotation of the tap holder. This form of construction is more economical than tap holders made for either right or left hand threading only.

The operation of the reversible tap holder of Fig. 12 is briefly as follows. The toggle lobe 71 is in the position where it has returned the receding clutch member 65 to the clutching engagement at the completion of the tapping operation and spindle 1 has already advanced in the direction of the work. Spindle 1 now continues to travel forward to the left as viewed in the drawings with the back-out pawls 63 in engagement with the slots 62a of shank 67a. As will be remembered from the description of Figs. 1 and 9 of the drawings this engagement of the back-out pawls with their slot is always maintained by coil spring 63a to maintain alignment of the clutch teeth 67 of the shank and the clutch teeth of the receding clutch 65 even when the receding clutch is out of engagement.

When the spindle 1 and the tap driver 55 advance to the left, disc 75 engaging the lobe face 73 will gradually rotate the lobe until after about one half of an inch of travel, the spring loaded toggle 77 after passing dead center will snap over to depress the lobe face 73 and raise face 74 to the up position.

Disc 75 is now clear of the lobe 71 in its forward travel and after spindle 1 has stopped and the tap holder 55 continues to advance in the direction of the work the receding clutch 65 will separate due to key 6J of the tap holder abutting the end of key slot 61 of the receding clutch to disengage the clutch teeth. When the teeth are separated to the point of engagement of the trail-off faces the receding clutch will kick out.

When the tap is withdrawn from the work by return movement of spindle 1, disc 75 will engage lobe face 74 and turn the lobe past dead center when the spring loaded toggle will snap the lobe with face 73 in raised position shown in Fig. 12. When movement of spindle 1 is reversed to again travel in the direction of the work, lobe face 73 acts as a stop against which disc 75 abuts to return the receding clutch 65 to clutching engagement.

In the type of reversing tap holders shown in Figs. 1, 9 and 12, employing the spring biased back-out pawls there is no possibility of jamming any of the operating parts as is the case where wedging rollers are employed. The construction of the above described form of tap holders largely eliminates friction and the back-out pawls always maintain alignment of the clutch teeth because of their space relation to the teeth and because of the spacing of the pawl slot with the teeth of the co-acting clutch member.

The type of reversing tap holder of Fig. 12 is especially useful for deep tapping because the threading spindle travel is limited and the spring loaded lobe has the effect of extending the tap driver before disengaging the receding clutch. In any of the types disclosed herein the coil spring 25 as shown in Fig. 1 snaps back the tap driver or holder when the threads of the tap are released from the work.

Although several embodiments of the invention have been herein illustrated and described it will be evident to those skilled in the art that various modifications may be made in the details of construction without departing from the principles herein set forth.

I claim:

1. In a tap holder a shank for mounting in a threading spindle said shank having a clutch head, a tap driver mounted on a shaft for sliding movement in the clutch head shank and a receding clutch having teeth coacting with said clutch head and mounted for sliding movement on said tap holder, said receding clutch having a radial fin and a swivel lobe disposed in the path of movement of said fin to engage the same, said lobe having a spring loaded toggle for snapping the lobe to the up position in the path of movement of said fin to move the receding clutch to clutch-engaging position.

2. In a tap holder a shank for mounting in a threading spindle said shank having a clutch head, a tap driver mounted for axial movement in the clutch head shank, a receding clutch coacting with said clutch head and keyed to said tap holder and a spring loaded swivel lobe for engaging said receding clutch in one direction of its movement to subject the lobe to snap action whereby said lobe constitutes an abutment for engaging and moving said receding clutch to its clutching position, the teeth of said clutch head and receding clutch having trail-off edges for forcibly disengaging the receding clutch when said edges effect contact in their declutching movement.

3. In a tap holder a hollow socket, a shank mounted therein and having spline connection therewith, said shank having a cylindrical head with external key slots and one or more angularly spaced axial bores, back-out pawls in said bores, springs in said pawls biasing the latter out of said bores, a tap holder having a shaft extending through said shank and having clutch teeth on the inner face thereof, a head mounted on the tap holder shaft having a slot for interacting with the back-out pawls and a receding clutch mounted on said tap holder and shank head having spline connection for sliding movement on the latter, the teeth of said clutches having trail-off edges which when engaged forcibly separate the receding clutch to release said tap holder for rotary movement.

4. In a reversible tap holder, a shank for mounting in a threading spindle, a tap holder mounted in said shank and having a head with a slot on the inner face thereof, back-out pawls mounted in said shank for engaging the slot in said head and a receding clutch having spline connection for sliding movement on said shank and head, said tap holder and receding clutch having juxtaposed teeth with trail-off edges for forcibly disengaging the receding clutch to permit free ratcheting movement of the tap holder.

5. In a reversible tap holder, a shank for mounting in a threading spindle, a tap holder mounted in said shank and having a head with a slot on the inner face thereof, back-out pawls mounted in said shank for engaging the slot in said head and a receding clutch having spline connection for sliding movement on said shank and head, said tap holder and receding clutch having juxtaposed teeth with trail-off edges for forcibly disengaging the receding clutch to permit free ratcheting movement of the tap holder, and said back-out pawls having teeth and means for maintaining directional alignment thereof with the ratchet slot to constitute the holder a left or right hand threading member as desired.

6. In a reversible tap holder, a shank for mounting in a spindle, a tap holder mounted in said shank having angularly spaced axial slots for receiving back-out pawls, a receding clutch having spline connection with the shank and having radial bores for receiving back-out pawls, spring means for biasing said pawls radially into the axial slots of the tap holder, said tap holder and receding clutch having interacting teeth with trail-off edges for disengaging the same when contacting to free the tap holder for rotary movement in one direction only.

7. In a reversible tap holder, a shank, a shaft mounted in said shank having spring means biasing the same into said shank, a tap holder mounted on and secured to said shaft having clutch teeth, said shank having a cylindrical head with angularly spaced axial bores and said tap holder having a transverse slot in register with said bores, back-out pawls in said bores having beveled faces disposed in said slot and having spring means biasing them to engage said slot, and a receding clutch splined on said shank having teeth interacting with the teeth of said tap holder, said teeth having trail-off edges which when engaged repel said receding clutch to release the tap holder for rotary movement in ratcheting engagement with said back-out pawls in one direction of rotation and in locking engagement with said pawls in the opposite direction of rotation.

8. A reversible tap holder as set forth in claim 7 characterized by the ratchet pawls having axial keyways engaged by keys in said shank for reversing the beveled faces of said pawls to reverse the direction of rotary movement in which the tap holder has free ratcheting movement with said pawls.

9. In a reversible tap holder, a shank for mounting in a threading spindle, said shank having a cylindrical head, a tap holder mounted in said shank having clutch teeth on the inner face thereof, a receding clutch mounted on said tap holder and shank head having spline connection for sliding movement on the latter, back-out pawls engaging slots in said tap holder, and spring means biasing said back-out pawls in the tap holder slots, the clutch teeth of said tap holder and receding clutch having trailing-off edges which when engaged forcibly separate the receding clutch to release said tap holder for rotary movement.

10. In a reversible tap holder, a shank for mounting in a threading spindle, said shank having a cylindrical head, a tap holder mounted in said shank and a sleeve having spline connection for axial movement on said shank and tap holder, said sleeve having clutch teeth interacting with clutch teeth constituting abutments at one end of the sleeve travel, the clutch teeth having trail-off edges which when engaged forcibly separate the sleeve to release the tap holder for rotary movement, and back-out pawls engaging said tap holder for locking the same when the tap is driven and for releasing said tap holder when the clutch teeth are separated.

CHARLES HOWARD HOOK.